United States Patent [19]

Kaneko et al.

[11] Patent Number: 5,306,443
[45] Date of Patent: Apr. 26, 1994

[54] METHOD FOR THE PREPARATION OF CONDUCTIVE POLYMER FILM

[75] Inventors: Takehira Kaneko, Odawara; Hirofumi Suzuki, Tokyo; Nobuo Matsui, Odawara; Tomio Yagihara, Kurashiki; Shiro Higashida, Ichihara; Akira Nakada, Ichihara; Hitoshi Matsumoto, Ichihara; Takeo Shimizu, Kyoto, all of Japan

[73] Assignee: Nippon Soda Co., Ltd., Tokyo, Japan

[21] Appl. No.: 588,586

[22] Filed: Sep. 26, 1990

Related U.S. Application Data

[63] Continuation of Ser. No. 329,425, Mar. 27, 1989, abandoned.

[51] Int. Cl.$^5$ .............................................. H01B 1/06
[52] U.S. Cl. .................................... 252/518; 252/519; 528/423; 526/258
[58] Field of Search ...................... 252/500, 518, 519; 526/256, 258; 528/422, 423

[56] References Cited

U.S. PATENT DOCUMENTS

| | | | |
|---|---|---|---|
| 4,665,129 | 5/1987 | Naarmann et al. | 252/500 |
| 4,680,236 | 7/1987 | Myers | 252/518 |
| 4,697,001 | 9/1987 | Walker et al. | 252/500 |
| 4,762,644 | 8/1988 | Kobayashi et al. | 252/500 |
| 4,880,508 | 11/1989 | Aldissi | 252/500 |
| 5,006,278 | 4/1991 | Elsenbaumer | 252/500 |

Primary Examiner—Mark L. Bell
Assistant Examiner—Deborah Jones
Attorney, Agent, or Firm—Joseph C. Mason, Jr.; Ronald E. Smith

[57] ABSTRACT

By the selective use of a homogeneous stable precursor solution in which no polymerization reactions immediately occur and which contains aromatic compounds such as pyrrole, thiophene, aromatic amines or their derivatives, oxidizing agents, and solvents, as a precursor solution of conductive polymer film, a homogeneous and tough conductive polymer film can be obtained when the said precursor solution is cast on a substrate and the solvents are evaporated to remove.

16 Claims, 7 Drawing Sheets

METHOD FOR THE PREPARATION OF CONDUCTIVE POLYMER FILM

CROSS-REFERENCE TO RELATED APPLICATION

This is a continuation of Ser. No. 07/329,425, filed Mar. 27, 1989, now abandoned which claims priority from PCT Ser. No. PCT/JP88/00764, filed Jul. 29, 1988, the filing date of which is claimed under 35 U.S.C. 120.

FIELD OF THE INVENTION

This invention relates to a method for the preparation of conductive polymer film, and more particularly relates to a method for the preparation of homogeneous conductive polymer film by the chemical polymerization of an aromatic compound.

DESCRIPTION OF RELATED ART

It is known that polymers of aromatic compounds such as pyrroles, thiophenes and anilines are conductive. However, these polymers themselves are insoluble and infusible, being difficult to be processed to moldings as the existing polymers can be.

There are two polymerization methods, electropolymerization and chemical polymerization, for aromatic compounds such as pyrroles or thiophenes. The former electropolymerization allows to directly form a polymer film on the electrode. The employment of this method is however difficult as an industrial method for the preparation of conductive polymer film because of the limitations of the size (area) of the obtained film and the size of the electrode and the requirement of electrolytic reaction equipment.

The chemical polymerization, on the other hand, can be carried out easily. Because of this, a large number of methods for the preparation of conductive polymer film by chemical polymerization have been proposed in recent years.

These methods include ① a method in which an oxidizing agent as a liquid phase is contacted with a heterocyclic 5-membered ring compound as a gas phase (Japanese unexamined Patent publication: Tokkaisho No. 61-51026), ② a method in which a polymerizable monomer is contacted as a gas or liquid phase with a resin molding containing an oxidizing agent (Japanese unexamined patent publication: Tokkaisho No. 61-123637, No. 61-157522), ③ a method in which a solution of polymerizable monomer and a solution of oxidizing agent are mixed to immediately spray on a substrates (Japanese unexamined patent publication: Tokkaisho No. 61-285216), and ④ a method in which an oxidizing agent solution and a heterocyclic 5-membered ring compound are mixed and the solution obtained after separating the precipitate from the mixture is painted or cast on a substrate (Japanese unexamined patent publication: Tokkaisho No. 62-11734).

In methods ③ and ④ using a mixture solution of polymerizable monomer and oxidizing agent, the polymerization of monomer occurs immediately. Therefore it is necessary to spray the mixture on a substrate immediately after being mixed or to remove the precipitate and then paint or cast the mixture on a substrate. It is however difficult to obtain a homogeneous and tough film even when these methods are applied.

The object of this invention is to provide a method for the preparation of homogeneous and tough conductive polymer film by chemical polymerization of aromatic compounds such as pyrrole, thiophene, aniline or their derivatives.

SUMMARY OF THE INVENTION

The object of this invention is attained by preparing a solution of polymer substance precursor, which has no immediate polymerization reaction and is stable for a long time, obtained with an appropriate selection of a combination of aromatic compounds, oxidizing agents and solvents, and is applied on a substrate to complete the polymerization while the solvent is removed.

If we describe it further in detail, the object of this invention is attained by the preparation of a stable and homogeneous solution after the monomers and oxidizing agents are mixed. The polymerization reaction occured only after evaporation of the solvents of the mixed solution. This method can give any desired shape of conducting polymer films by evaporation of solvents after the mixed solution is applied on a substrate. The obtained polymer films had high electronic-conductivity with good mechanical strength.

This invention comprises a combination of
(a) at least an aromatic compound, preferably a compound selected from the group consisting of pyrrole, thiophene, aromatic amine and their derivatives,
(b) at least an oxidizing agent, and
(c) at least a solvent, which has no immediate polymerization reaction. A homogeneous and stable solution, is prepared and is applied on a substrate, and the solvent is evaporated.

The obtained polymer film is homogeneous. The selection of a specific compound from aromatic compounds gives a film able to be handled after it is peeled off the substrate. A very strong film is obtained particularly when a 3,4-asymmetrically substituted pyrrole derivative having a —COOR group (where R is an alkyl, a benzyl or phenyl group) either at the 3 or 4 position is used as an aromatic compound alone or by mixing with others. This invention is further described in detail in the following.

Solution Components (1) Aromatic Compounds

Pyrrole and its derivatives;

Pyrrole, pyrrole dimer, 3,3'-dimethyl-2,2'-bipyrrole-4,4'-dicarboxylic acid distearyl ester, 3,3'-dimethyl-2,2'-bipyrrole-4,4'-dicarboxylic acid dihexyl ester, 3,3'-dimethyl-2,2'-dithiophene, 3,3'-dihexyl-2,2'-dithiophene, 4-methylpyrrole-3-carboxylic acid, 4-phenylpyrrole-3-carboxylic acid, 4-methylpyrrole-3-carboxylic acid methyl ester, 4-methylpyrrole-3-carboxylic acid ethyl ester, 4-n-propylpyrrole-3-carboxylic acid methyl ester, 4-n-propylpyrrole-3-carboxylic acid ethyl ester, pyrrole-3-carboxylic acid methyl ester, 3-methylpyrrole, 3-hexylpyrrole, pyrrole-3-carboxylic acid, 4-methylpyrrole-3-carboxylic acid hexyl ester, 4-benzylpyrrole-3-carboxylic acid methyl ester, 4-methylpyrrole-3-carboxylic acid dodecyl ester, pyrrole-3-carboxylic acid stearyl ester, 4-phenylpyrrole-3-carboxylic acid stearyl ester, 3-phenylpyrrole, 3-acetopyrrole, 3-undecylcarbonylpyrrole, 3-aminomethyl-4-methylpyrrole, 3-aminomethyl-4-phenylpyrrole, 3-acetoaminomethyl-4-phenylpyrrole, 3-benzoylpyrrole, 3-methyl-4-dimethylaminocarbamoylpyrrole, 3-methyl-4-dimethylaminomethylpyrrole, 4-methylpyrrole-3-carboxylic acid phenyl ester, 4-methylpyrrole-3-carboxylic acid benzyl ester, 4-methylpyrrole-3-carboxylic acid 4-phenylazophenyl ester, 4-methylpyrrole-3-carboxylic acid 16-bromo-2,3,5,6,8,9,11,12-octahydro-1,4,7,10,13-benzopentaoxacyclopentadecin-15-ylmethyl ester, etc.

Particularly, 3,4-asymmetrically substituted pyrrole derivatives having a —COOR group (where R is an alkyl, a benzyl or a phenyl group) at the 3 or 4 position such as pyrrole-3-carboxylic acid alkyl ester, 4-methylpyrrole-3-carboxylic acid alkyl ester and 4-benzylpyrrole-3-carboxylic acid alkyl ester are preferable.

Thiophene and its derivatives:

Thiophene, alkyl substituted thiophenes such as 3-methylthiophene, 3,4-dimethylthiophene, 3-hexylthiophene and 3-stearylthiophene, halogen substituted thiophenes such as 3-bromothiophene, and polyether substituted thiophenes such as 3-methoxydiethoxymethylthiophene,

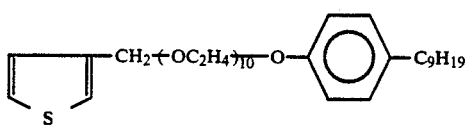

3-phenylthiophene, 3-benzylthiophene, 3-methyl-4-phenylthiophene, 2,3'-bithiophene, 2,2'-bithiophene, 2,2',2''-terthiophene, etc. Particularly, thiophenes with substituent of an alkyl having 6 carbons or more are preferable.

Aromatic amine and its derivatives:

Aniline, N-monosubstituted anilines (whose substituents include an alkyl, phenyl, p-aminophenyl, N-monoalkylamimophenyl, N-monophenylaminophenyl and N-monophenylaminodiphenyl, etc.), substituted anilines [whose substituents include o-amino, amino p-(p-aminophenoxy), p-(p-aminophenyl), etc.], polycyclic condensed aromatic amines such as naphthylamine and perylene, etc. These aromatic amines may have a substituent on the benzene ring, Particularly non-substituted aniline is preferable.

Others:

Benzene, diphenyl, naphthalene, anthracene, azulene, carbazol, benzothiophene, etc. These may have substituents.

It is possible to use a mixture system with a monomer modified with a substituent having such a function as trapping of metal ion species, optical-electric response or bio-catalytic function such as enzyme (e.g. crown ethers and polyethylene oxide which fix alkali metals, 8-hydroxyquinoline able to form a complex with various types of metals, or azobenzene compounds, quinone, riboflavin and riboflavin analogs, etc.).

The said aromatic compounds can be used as a mixture with the same or different kind of compounds.

(2) Oxidizing Agents:

$FeCl_3$, $CuCl_2$, $Fe(NO_3)_3$, $SbCl_5$, $MoCl_5$, etc, or their hydrates or their mixtures. Particularly $FeCl_3$, $FeCl_3 \cdot 6H_2O$ and $Fe(NO_3)_3 \cdot 9H_2O$ are preferable. A preferable amount of oxidizing agent used is 1 to 10 moles, particularly 1 to 4 moles is preferable, to 1 mole of the said aromatic compound.

(3) Solvents:

Aliphatic ethers such as diethylether, diisobutylether, di-n-butylether, diisopropylether and dimethoxyethane, cyclic ethers such as THF and dioxane, alcohols such as methanol, ethanol and isopropyl alcohol, halogenated hydrocarbons such as methylene chloride and chloroform, aromatic hydrocarbons such as benzene, toluene and xylene, aliphatic hydrocarbons such as hexane and heptane, alicyclic hydrocarbons such as cyclohexane, esters such as acetic acid ethyl ester and acetic acid butyl ester, aliphatic and alicyclic ketones such as acetone, methylethylketone, methylisobutylketone and cyclohexanone, nitroalkanes such as nitromethane, or mixtures of these solvents. Particularly diethylether, methanol, THF, etc., and mixtures of these solvents are preferable. A preferable amount of solvent used is from an amount required for dissolving the oxidizing agent to be a homogeneous solution to a volume 50 times of this amount, particularly a volume of 10 to 30 times is preferable.

(4) Other Components:

1 Binder

Such substances as coupling agents and polymers can be used in order to improve such conditions as adhesion of the conductive polymer film on substrates or film quality.

Silane coupling agents and titanium coupling agents can be used as coupling agents. Silane coupling agents such as γ-glycidoxypropyltrimethoxysilane, γ-(methacryloxypropyl) trimethoxysilane, N-phenyl-γ-aminopropyltrimethoxysilane and γ-chloropropyltrimethoxysilane are preferably used. An amount of coupling agent added is 0.1 to 10 parts by weight to 100 parts by weight of the aromatic compound. It is not preferable if an addition amount is too small because its addition effect is not clear or if excessive because the conductivity or electrochromic property of the conductive polymer film lowers.

Polymers which dissolve in the aforementioned organic solvents and harden by drying or heating are used as the polymer. Applicable polymers include polymethylmethacrylate (PMMA), polyvinyl chloride (PVC), polyvinyl alcohol (PVA), polystyrene (PS), polyethylene oxide (PEO) and polypropylene oxide (PPO), etc. An amount of these polymers added is 0.1 to 10 parts by weight to 100 parts of the aromatic compound. It is not preferable if the addition amount is too small because its addition effect is not clear or if excessive because the conductivity or electrochromic property of the conductive polymer film lowers. Polymer electrolytes such as polystyrene sulfonate and polyvinyl sulfonate may be added to stabilize the conductivity and to improve the mechanical performance.

2 Functional materials

Materials with electric response function including quinone compounds such as benzoquinone, naphthoquinone and anthraquinone, organic metal complex compounds such as ferrocene and ruthenium dipyridyl complex, and tungsten oxide.

Materials with energy conversion function such as rhodamine B, thionine, metal-phthalocyanine, and metal-porphyrin.

Materials with metal trapping function such as crown ether, and quinoline.

Materials with oxidation-reduction ability such as enzymes.

3 Others e.g. thickeners such as aerozyl and cellulose derivatives.

Types of Substrates

Concrete examples of substrates, on which the aforementioned solution of polymer substance precursor of this invention is applied, are listed: glass plate, metal plate, polymer film, ceramic plate, glass plate coated with conductive film, fiber, paper, rod, pipe, etc. The surface of these substrates may be treated beforehand by using such an agent as a silane coupling agent.

Application Method of Solution on Substrates

Applicable methods for the application of the said precursor solution on the said substrate including casting, dipping, spraying, ultrasonic foggeneration and spin coating, etc.

Out of the above methods, the ultrasonic foggeneration and spin coating method are described below.

The ultrasonic foggeneration is a method that the said solution is foggenerated to make fine particles disperse into a carrier gas by using ultrasonic foggenerator, the carrier gas is introduced on a substrate at room temperature or heated beforehand so that the surface of the substrate contacts with the said fine particles of the solution, and a post heating treatment, if necessary, is carried out.

An applicable ultrasonic foggenerator is one with a structure in which ultrasonic vibration is oscillated to foggenerate the said solution to be fine particles to disperse into a carrier gas.

Particularly, a foggenerator capable of oscillating an ultrasonic vibration of 0.5 to 3 MHz is preferably used.

The spin coating method is a method whereby the said solution is thickly applied on the substrate uniformly by using a spin coater. A spin coater capable of changing speed between 20 to 10,000 rpm and with no mandrel deflection is usually used.

Method for evaporation removal of solvent

A method employed to remove the solvent is maintaining the substrate on which the solution is applied at about 0° to about 200° C. preferably room temperature to 100° C., by using such an apparatus as a drying oven or vacuum drying oven. Other methods such as maintaining a substrate on which the solution is applied in a dust-proof hood which is placed on a hot plate to heat or heating the substrate by using an infrared lamp may be employed.

Doping

The polymer film obtained by the said method, after being washed, is doped by ordinary methods in order to make the film conductive.

Figure 1:
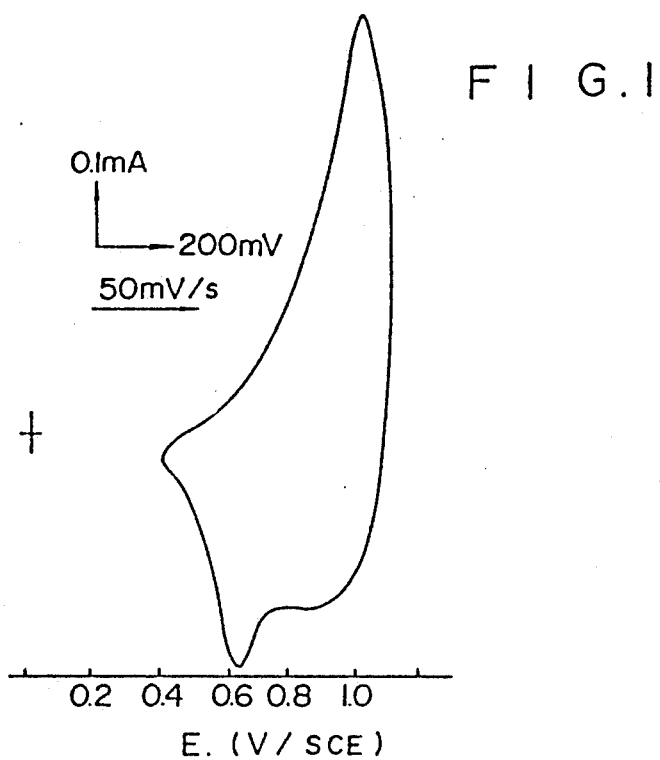
FIG. 1 shows the cyclic voltammogram (hereinafter abbreviated as C.V.) of bithiophene polymer film/Pt in 0.1 mol/l TBAP (Note 1)/CN$_3$CN electrolyte, obtained in Example 43.

(Note 1) TBAP: Tetrabutyl ammonium perchlorate
(Note 2) ITO glass: conductive glass coated with indium oxide containing tin
(Note 3) BDP: 7,14-diethyl-3,10-dimethylbenzodipteridine
(Note 4) RAS: reflection absorption spectroscopy

DESCRIPTION OF THE PREFERRED EMBODIMENTS

This invention is further described in detail by reference to the following examples. The range of this invention is not limited at all by the following examples.

(1) Pyrrole compound polymer film

EXAMPLE 1

3.3 g (0.02 mol) of anhydrous ferric chloride (FeCl$_3$) was dissolved in 50 ml of dried diethyl ether, and the precipitate was filtrated to give a homogeneous oxidizing solution. 0.7 g (0.005 mol) of 4-methylpyrrole-3-carboxylic acid methyl ester (MPYCM) was dissolved in 2 ml of dried diethyl ether. The pyrrole derivative solution was added to the oxidizing solution kept at 0° C. beforehand. This solution had no deposit of precipitates and was homogeneous.

This solution was dropped on a glass plate and air dried at ordinary temperature and atmospheric pressure, giving a reddish brown or reddish black polymer film on the glass plate. The obtained film was washed with water and then with acetone, and dried under reduced pressure for one day and night. After that, the dried film was kept under iodine vapour for doping iodine, and then measured for the conductivity by four probe method (according to Van de Pauw method, on page 218, thermodynamic electric and optical properties, KOUBUNSHIJIKKENGAKU (Polymer Experiment 12). The film had the conductivity of $2 \times 10$ S/cm.

EXAMPLES 2 to 26 AND 30

Example 1 was repeated except using the respective example conditions shown in Table 1. The results are shown in Table 1.

EXAMPLES 27 and 28

The homogeneous mixture solution obtained in Example 1 was dipped in (Example 27) or sprayed on (Example 28) a qualitative filter paper, and then the solvent was air dried to give a polymer film. The results are shown in Table 1.

EXAMPLE 29

1.02 g (0.013 mol) of anhydrous ferric chloride (FeCl$_3$) was added to dissolve in 50 ml of dried methanol. To this solution was added 0.52 g (0.0025 mol) of 4-hexylpyrrole-3-carboxylic acid methyl ester (hereinafter abbreviated as HPYCM) to stir to dissolve for an hour. This solution had no deposit of precipitates and was homogeneous.

This solution was foggenerated to be fine particles to disperse in the carrier gas of nitrogen (introducing speed: 3 l/min) by using a ultrasonic foggenerator. The carrier gas containing the fine particles consisting of the said components was introduced into a hood covering 3 soda lime glass plates (30 mm×60 mm) and a soda lime glass plate whose surface was treated by coating with a silane coupling agent (KBM-403, Shin-Etsu Chemical Co., Ltd.) (30 mm×60 mm) at room temperature for 30 minutes, so that the fine particles of the sample were deposited on the plates. After the deposition of the fine particles, the plates were heated at 50° C. for 30 minutes under the atmosphere of nitrogen gas for the post heating treatment.

The obtained plates on which the polymer film was formed were washed twice with methanol, dried at room temperature under reduced pressure, and then doped with iodine.

A cellophane tape peal test was carried out for the obtained polymer films according to the JIS paint testing method, with the results showing that the film had excellent adhesion. The film formed on the soda lime glass plate treated with silane coupling agent particularly exhibited more excellent adhesion.

The obtained polymer films were measured for the conductivity by the four probe method.

EXAMPLE 31

Example 29 was repeated except that 4-methylpyrrole-3-carboxylic acid stearyl ester (hereinafter abbreviated as MPYCS) was used as a pyrrole derivative and THF as a solvent.

COMPARATIVE EXAMPLE 1

5 ml of 10% by weight ethanol solution of pyrrole and 5 ml of 10% by weight aqueous solution of Na$_2$S$_2$O$_8$ were mixed, resulting in deposition of Na$_2$S$_2$O$_8$ as white colloid. Black precipitate was formed around the colloid. This mixture solution was applied on a substrate to dry at 60° C. The results are shown in Table 1.

COMPARATIVE EXAMPLE 2

5 ml of 10% by weight ethanol solution of pyrrole and 5 ml of 10% by weight aqueous solution of FeCl$_3$ were mixed, and immediately a black precipitate was formed. This mixture solution was applied on a substrate to dry at 60° C. The results are shown in Table 1.

Comparative Example 3

Mixing of 5 ml of 10% by weight THF solution of pyrrole and 5 ml of 10% by weight aqueous solution of FeCl$_3$ resulted in separating into 2 layers. This mixture solution was applied on a substrate to dry at 60° C. The results are shown in Table 1.

Comparative Example 4

Mixing of 5 ml of 10% by weight DMSO solution of pyrrole and 5 ml of 10% by weight aqueous solution of FeCl$_3$ resulted in separating into 2 layers. This mixture solution was applied on a substrate, giving no film. The results are shown in Table 1.

Comparative Example 5

A solution of which 10 g (0.04 mol) of FeCl$_3$ . 6H$_2$O was dissolved in 40 ml of methanol was added to a solution of which 4 ml (0.06 mol) of pyrrole was dissolved in 40 ml of methanol, and the mixture was stirred. After a minute, precipitation started. After about an hour, the mixture solution was filtrated to remove the precipitate, the filtrate was applied on a glass plate, then the solvent was evaporated to remove. The results are shown in Table 1.

Comparative Example 6

3.3 g (0.02 mol) of anhydrous ferric chloride (FeCl$_3$) was dissolved in 50 ml of dried diethyl ether used as an oxidizing solution. 0.7 g (0.005 mol) of 4-methylpyrrole-3- carboxylic acid methyl ether (MPYCM) was dissolved in 2 ml of diethyl ether. This solution and the oxidizing solution were placed in a three neck flask with a thermometer, a condenser and a calcium chloride tube, and reacted at room temperature (25° C.). The reaction progress was checked by using a thin layer plate (TLC) until the monomer disappeared. It took 72 hours for the disappearance of monomer. The deposited precipitate was filtrated, and sufficiently washed each with H$_2$O, 0.5—HCl and H$_2$O in this order, giving 0.5 g of black polymer substance. (Yield: 71.4%). The polymer substance was dried in a deisccator under reduced pressure for a day and night, and measured as a tablet sample of 1 cm in diameter for the conductivity. The result was $2 \times 10^{-2}$ S/cm.

Comparative Example 7

0.684 g (0.1 mol/l) of tetra-n-butyl ammonium perchlorate (TBAP) was dissolved in 20 ml of acetonitrile, and 0.278 g (0.1 mol/l) of 4- methylpyrrole-3- carboxylic acid methyl ester (MPYCM) was dissolved to use as an electrolyte. The electrolyte was placed in an electrolytic cell with platinum plates as the two electrodes, degassed by passing N$_2$ gas through, and applied electricity. The film electrodeposited on the anode was washed with pure acetonitrile, dried under reduced pressure, and measured by the conductivity. The result was 3.9 S/cm.

TABLE 1

| | | | | | | | | | | |
|---|---|---|---|---|---|---|---|---|---|---|
| | Monomer | | Solvent | | Oxidizing agent | | | Solvent | Film characteristic | |
| Example | Compound | Q'ty (mol) | Compound | Q'ty (ml) | Compound | Q'ty (mol) | *1Solvent Stability | removing method | *2Property | Conductivity (S/cm) |
| 1 | 4-methyl-pyrrole-3-carboxylic acid methyl ester | 0.005 | diethyl ether | 50 | FeCl$_3$ | 0.02 | ≧100 min | Ordinary temp and pressure | ○ | 2 × 10 |
| 2 | 4-methyl- | " | diethyl | 48.5 | " | " | ≧2 days | Ordinary | ○ | 4.2 |

TABLE 1-continued

Pyrrole Compound Polymer Film

| Example | Monomer Compound | Q'ty (mol) | Solvent Compound | Q'ty (ml) | Oxidizing agent Compound | Q'ty (mol) | *1 Solvent Stability | Solvent removing method | *2 Property | Film characteristic Conductivity (S/cm) |
|---|---|---|---|---|---|---|---|---|---|---|
| | pyrrole-3-carboxylic acid methyl ester | | ether + methanol | 1.5 | | | | temp and pressure | | |
| 3 | 4-methyl-pyrrole-3-carboxylic acid methyl ester | " | dimethoxy-ethane | 50 | " | " | ≧100 min | Ordinary temp and pressure | ○ | 1.0 |
| 4 | 4-methyl-pyrrole-3-carboxylic acid | " | diethyl ether | " | " | " | " | Ordinary temp, reduced pressure | ○ | $2.0 \times 10^{-1}$ |
| 5 | 4-methyl-pyrrole-3-carboxylic acid methyl ester | " | dimethoxy-ethane + methanol | 100 40 | Fe(NO$_3$)$_3$·9H$_2$O | " | " | Ordinary temp and pressure | ○ | $5.5 \times 10^{-1}$ |
| 6 | pyrrole | " | methanol + THF | 40 10 | FeCl$_3$ | " | ≧2 days | Ordinary temp and pressure | △ | $5.0 \times 10^{-2}$ |
| 7 | 4-benzyl-pyrrole-3-carboxylic acid methyl ester | 0.001 | diethyl ether | 10 | " | 0.003 | ≧100 min | Hot plate (40° C.) | ◉ | $6.3 \times 10^{-2}$ |
| 8 | 3-hexylpyrrole | " | diethyl ether | " | FeCl$_3$·6H$_2$O | " | " | Hot plate (40° C.) | ○ | $2.3 \times 10^{-4}$ |
| 9 | 4-methyl-pyrrol-3-carboxylic acid hexyl ester | " | diethyl ether | " | FeCl$_3$ | " | " | Hot plate (40° C.) | ◉ | 6.5 |
| 10 | 4-methyl-pyrrol-3-carboxylic acid hexyl ester | " | THF | " | " | " | ≧2 days | Hot plate (40° C.) | ○ | $3.6 \times 10^{-1}$ |
| 11 | 4-methyl-pyrrol-3-carboxylic acid dodecyl ester | " | diethyl ether | " | " | " | " | Ordinary temp and pressure | ○ | $9 \times 10^{-1}$ |
| 12 | pyrrole-3-carboxlic acid | " | methanol | " | " | " | " | Hot plate (50° C.) | ○ | $1.7 \times 10^{-2}$ |
| 13 | pyrrole-3-carboxlic acid stearyl ester | " | diethyl ether | " | " | " | ≧2 days | Hot plate (40° C.) | ○ | $2.6 \times 10^{-4}$ |
| 14 | 4-phenyl-pyrrole-3-carboxylic acid stearyl ester | " | diethyl ether | " | " | " | ≧100 min | Hot plate (40° C.) | c | $3.9 \times 10^{-1}$ |
| 15 | 3-undecyl-carbonylpyrrole | " | diethyl ether | " | " | " | " | Hot plate (40° C.) | ○ | $1.6 \times 10^{-4}$ |
| 16 | 3-acetopyrrole | " | " | " | " | " | " | Hot plate (40° C.) | c | $2 \times 10^{-1}$ |
| 17 | 3-aminomethyl-4-methylpyrrole | " | methanol | " | " | " | " | Hot plate (40° C.) | △ | $1.6 \times 10^{-4}$ |
| 18 | 3-aminomethyl-4-phenylpyrrole | " | " | " | " | " | " | Hot plate (40° C.) | △ | $6.6 \times 10^{-5}$ |
| 19 | 3-acetoamino-methyl-4-phenylpyrrole | " | " | " | " | " | " | Hot plate (40° C.) | △ | $1.5 \times 10^{-3}$ |
| 20 | 3-benzoyl-pyrrole | " | diethyl ether | " | " | " | " | Hot plate (40° C.) | △ | $9.2 \times 10^{-4}$ |
| 21 | 3-methyl-4-dimethylamino-carbamoyl-pyrrole | " | diethyl ether | " | " | " | " | Hot plate (40° C.) | ○ | $3.7 \times 10^{-4}$ |
| 22 | 3-methyl-4-dimethylamino-methylpyrrole | " | diethyl ether | " | " | " | " | Hot plate (40° C.) | △ | $2.6 \times 10^{-5}$ |
| 23 | 3-phenylpyrrole | " | THF | " | FeCl$_2$·6H$_2$O | " | " | Hot plate (40° C.) | △ | $4.7 \times 10^{-5}$ |
| 24 | 3-benzylpyrrole | " | " | " | FeCl$_3$ | " | " | Hot plate (40° C.) | △ | $1.6 \times 10^{-4}$ |
| 25 | 4-methyl-pyrrole-3-carboxylic acid phenyl ester | " | diethyl ether | " | " | " | " | Ordinary temp and pressure | ○ | $4.2 \times 10^{-1}$ |
| 26 | 4-methyl-pyrrole-3-carboxylic acid benzyl ester | " | diethyl ether | " | " | " | " | Ordinary temp and pressure | ◉ | 2.9 |

TABLE 1-continued

| | Pyrrole Compound Polymer Film | | | | | | | | |
|---|---|---|---|---|---|---|---|---|---|
| | Monomer | | Solvent | | Oxidizing agent | | *¹Solvent Stability | Solvent removing method | Film characteristic | |
| Example | Compound | Q'ty (mol) | Compound | Q'ty (ml) | Compound | Q'ty (mol) | | | *²Property | Conductivity (S/cm) |
| 27 | 4-methyl-pyrrole-3-carboxylic acid methyl ester | 0.005 | diethyl ether | 50 | " | 0.02 | " | Ordinary temp and pressure | ○ | $1.0 \times 10^{-1}$ |
| 28 | 4-methyl-pyrrole-3-carboxylic acid methyl ester | " | diethyl ether | " | " | " | " | Ordinary temp and pressure | ○ | $1.0 \times 10^{-2}$ |
| 29 | 4-hexyl-pyrrole-3-carboxylic acid methyl ester | 0.0025 | methanol | " | " | 0.006 | " | N₂gas, 50° C. | ⊙ | $2.2 \times 10^{-3}$ |
| 30 | 4-hexyl-pyrrole-3-carboxylic acid methyl ester | " | THF | " | " | " | ≧2 days | Hot plate (40° C.) | ○ | — |
| 31 | 4-methyl-pyrrole-3-carboxylic acid stearyl ester | " | " | " | " | " | ≧100 min | N₂gas, 50° C. | ○ | $5.4 \times 10^{-2}$ |
| Comparative 1 | pyrrole | 0.007 | ethanol | 5 | Na₂S₂O₈ | 0.002 | Precipitate | 60° C. | x | — |
| Comparative 2 | " | " | " | " | FeCl₃ | 0.003 | " | " | x | — |
| Comparative 3 | " | " | THF | " | " | " | Separate to 2 layers | " | x | — |
| Comparative 4 | " | " | DMSO | " | " | " | Separate to 2 layers | " | x | — |
| Comparative 5 | " | 0.06 | methanol | 80 | FeCl₃.6H₂O | 0.04 | Precipitate | Ordinary temp and pressure | Δ | — |

*¹Solvent stability
"≧100 min" and "≧2 days" means that no precipitation occurs at least in 100 minutes and in 2 days, respectively, after each pertinent monomer, oxidizing agent and solvent are mixed.
*²Film property
⊙: Homogeneous film with self retentivity and high strength.
○: Homogeneous film with self retentivity.
Δ: Homogeneous film.
x: No film is obtained, or non-homogeneous film even if obtained.

(2) Thiophene Compound Polymer Film

Example 32

1.62 g (0.01 moles) of anhydrous ferric chloride (FeCl₃) was dissolved in 50 ml of dried diethyl ether to use as an oxidizing solution. To this oxidizing solution kept at 0° C., 0.5 g (0.005 mol) of 3- methylthiophene was added. The resulting solution had no deposit of precipitates and was homogeneous.

This solution was cast on a glass plate and heated at 60° C. under reduced pressure of 30 mm Hg. A black film was obtained on the glass plate. The obtained film was washed with water and then with acetone, dried in a vacuum desiccator for a day and night, doped with iodine by keeping under iodine vapor, and then measured for the conductivity by the four probe method to give the result of $9.0 \times 10^{20}$ S/cm.

The said homogeneous mixture solution was cast on a platinum plate, and the same procedure was repeated. The obtained film was measured for cyclic voltammograms (C.V.) in 0.1 mol/l of tetrabutyl ammonium perchlorate (TBAP) acetonitrile according to an ordinary method. The film had the anode peak voltage at 800 mV (versus KCl saturated calomel electrode) and the cathode peak voltage at 640 mV (versus Kcl saturated calomel electrode, and showed a reversible electric response. Simultaneously the film on the platinum plate changed its color, dark blue in the oxidation state and red in the reduction state, and had stable and reversible electrochromism characteristics.

Examples 33 to 45

Example 32 was repeated except using the respective example conditions shown in Table 2. The results are shown in Table 2.

In Example 43 the following test was performed.

The homogeneous mixture solution was poured onto a platinum plate used as a substrate, the solvent was evaporated at room temperature. A blue polymer substance was formed on the substrate simultaneously with the evaporation of the solvent. The formed substance was washed with water and then with methanol, and dried. The platinum plate with the bithiophene polymer polymerized on the platinum was placed as a working electrode in 0.1 mol/l of TBAP (tetrabutyl ammonium perchlorate)/CH₃CN, and, with a Pt wire of counter electrode and KCl saturated calomel reference electrode (SCE), was degassed by N₂ gas stream. A cyclic voltammogram (3 electrode method) was measured. The polymer substance had a stable electric response as shown in FIG. 1.

Figure 2:
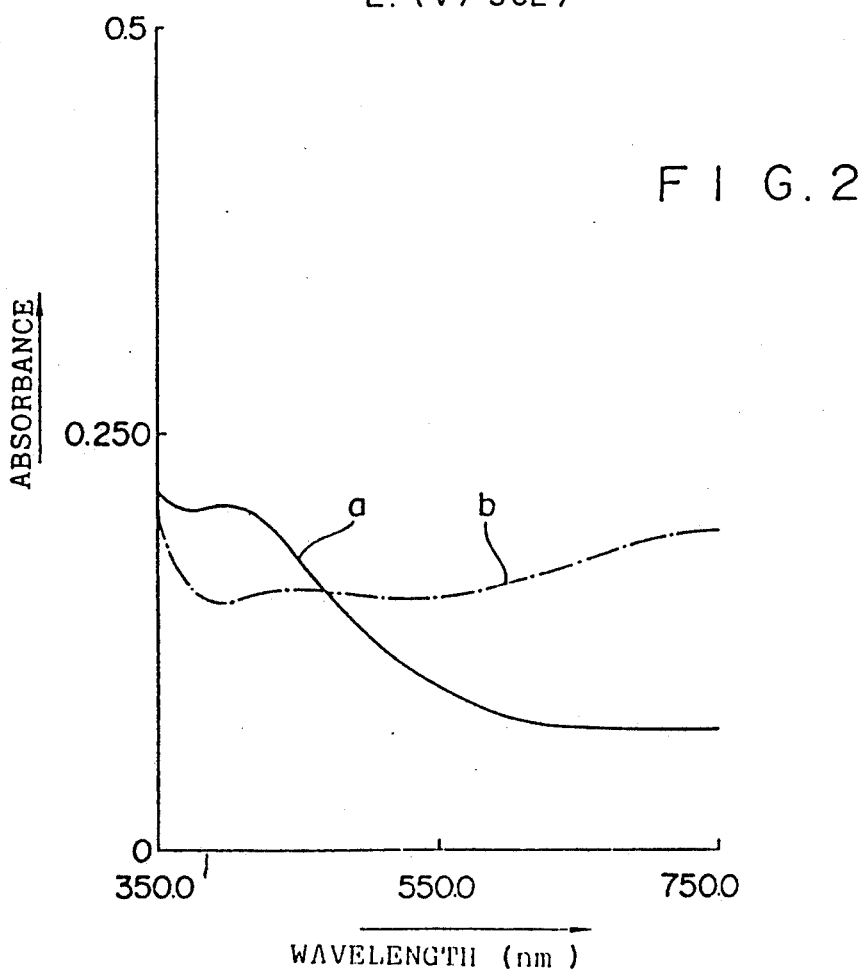
FIG. 2 shows the UV-VIS spectrum of bithiophene polymer film on the ITO glass (Note 2) plate, obtained in Example 43.
  a: reduction state at 300 mV/SCE
  b: oxidation state at 1,200 mV/SCE

The homogeneous mixture solution was poured onto an ITO glass plate used as a substrate and polymer substance was formed on the ITO glass plate. This ITO glass modification electrode was attached to a UV quartz cell and measured in the said electrolyte by 3 electrode method. As a result, a clear color change was observed in the oxidation state (blue) and in the reduction state (orange). The spectrum of visible rays is shown in FIG. 2.

Examples 46 to 48

Example 29 was repeated except using the respective example conditions shown in Table 2. The results are shown in Table 2.

(3) Aromatic Amine Polymer Film

Example 49

0.5 g (0.005 mol) of light yellow commercially available aniline was distilled to purify was added to a solution of which 2.62 g (0.016 mol) of anhydrous ferric chloride ($FeCl_3$) was dissolved in 30 ml of methanol and which was used as an oxidizing solution. The resulting solution immediately became reddish black and homogeneous.

This mixture solution was cast onto a glass plate, and heated to 60° to 80° C. A black or dark blue film was formed on the glass plate.

The film was washed with distilled water and then with acetone, and dried in a desiccator under reduced pressure for a day and night. The dried film was measured by the four probe method for the conductivity. The result was 2.4 S/cm.

Examples 50 to 52

Example 49 was repeated except using the respective example conditions shown in Table 2. The results are shown in Table 2.

Example 53

8.1 g of anhydrous ferric chloride ($FeCl_3$) was dissolved in 100 ml of THF. To the resulting solution was added 4.6 g of aniline with stirring to prepare a dark brown precursor solution.

On a glass plate of 100 mm × 100 × 1.3 mm, applied with brush beforehand was a methanol solution containing 1% by weight of γ-glycidoxypropyl trimethoxysilane (silane coupling agent: trade name KBM-403, Shin-Etsu Chemical Co., Ltd.) and 1% by weight of water. The glass base plate was air dried, and fixed on the center on a spin coater. The precursor solution prepared above was dropped by using a dropping pipet on the central part of the substrate while the coater was kept rotating at a rotation speed of 260 rpm. Then the spin coater was speeded up to 720 rpm and rotated for another 40 seconds for the formation of homogeneous film of precursor solution on the substrate.

Then the substrate was placed in a drying oven at a temperature of 70° C. for 30 minutes in order to evaporate and remove the solvent to THF. An aniline polymer film was thus formed on the plate.

The formed aniline polymer film was washed with methanol and dried at ordinary temperature under reduced pressure, giving a conductive polymer film. The results are shown in Table 2.

Comparative Example 8

1.86 g of aniline and 5 ml of 12N aqueous hydrochloric acid solution were dissolved in 100 ml of water placed in a 500 ml conical beaker and heated to 40° C. A solution of 4.97 g of ammonium peroxydisulfate was dissolved in 200 ml of water and added over 1.5 hours with stirring.

The precipitate formed due to the reaction was filtrated, and washed with water, with 2N aqueous hydrochloric acid solution and futhermore with methanol, and dried at ordinary temperature under reduced pressure. 1.58 g of blackish green aniline polymer of fine powder was obtained.

The obtained aniline polymer was placed in a 100 ml ball mill and 30 ml of acetic acid amyl ester and 0.1 g of the aforementioned silane coupling agent were added and wet pulverized for 30 hours. Then THF was further added to dilute 10 times to prepare a slurry for the formation of conductive polymer film.

This slurry was used to spin coat a glass substrate under the same conditions as those used in Example 53, and dried at 70° C. The result was no formation of conductive polymer film because the aniline polymer did not adhere on the substrate and moved up as powder.

TABLE 2

| | Thiophene Compound and Aromatic Amine Polymer Film | | | | | | | | | |
|---|---|---|---|---|---|---|---|---|---|---|
| | Monomer | | Solvent | | Oxidizing agent | | | Solvent removing method | Film characteristic | |
| Example | Compound | Q'ty (mol) | Compound | Q'ty (ml) | Compound | Q'ty (mol) | Solvent Stability | | Property | Conductivity (S/cm) |
| 32 | 3-methylthiophene | 0.005 | diethyl ether | 50 | $FeCl_3$ | 0.01 | ≧2 days | Reduced pressure, 60° C. | Δ | 9.0 |
| 33 | 3-methoxydiethoxymethyl-thiophene | " | methanol | 33 | " | " | " | Hot plate (50° C.) | O | $8.7 \times 10^{-3}$ |
| 34 | 3-bromothiophene | " | " | 50 | " | 0.015 | ≧100 min | " | O | $3.4 \times 10^{-4}$ |
| 35 | 3-phenylthiophene | 0.001 | diethyl ether | 10 | " | 0.003 | " | Hot plate (50° C.) | Δ | $1.6 \times 10^{-1}$ |
| 36 | 3-benzylthioiphene | " | " | " | " | " | " | " | O | $1.0 \times 10^{-3}$ |
| 37 | 3-(4-methylphenyl)thiophene | " | " | " | " | " | " | " | Δ | $4.9 \times 10^{-2}$ |
| 38 | 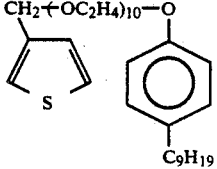 | " | methanol | " | " | " | " | Hot plate (220° C.) | Δ | $1.2 \times 10^{-6}$ |
| 39 | 3,4-dimethylthiophene | 0.005 | diethyl ether | 50 | " | 0.01 | " | Hot plate | Δ | $3.0 \times 10^{-3}$ |

TABLE 2-continued

Thiophene Compound and Aromatic Amine Polymer Film

| Example | Monomer Compound | Q'ty (mol) | Solvent Compound | Q'ty (ml) | Oxidizing agent Compound | Q'ty (mol) | Solvent Stability | Solvent removing method | Film characteristic Property | Conductivity (S/cm) |
|---|---|---|---|---|---|---|---|---|---|---|
| 40 | 3-hexylthiophene | " | " | " | " | " | " | (50° C.) " | ○ | $5 \times 10^{-1}$ |
| 41 | 3-stearylthiophene | 0.003 | " | " | " | " | ≧2 days | " | ○ | 1.6 |
| 42 | 2,3'-bithiophene | 0.001 | " | 10 | " | 0.003 | ≧100 min | " | △ | $1.6 \times 10^{-1}$ |
| 43 | 2,3'-bithiophene | " | " | " | " | " | " | Room temp | △ | $1.0 \times 10^{-1}$ |
| 44 | " | " | diethyl ether + methanol | 9.5 0.5 | " | " | ≧2 days | " | △ | 3.7 |
| 45 | 2,2',2"-terthioiphene | " | THF | " | " | " | ≧100 min | " | △ | $1.0 \times 10^{-2}$ |
| 46 | 4-hexylthiophene | 0.0025 | " | 50 | " | 0.006 | " | $N_2$ gas, 50° C. | △ | $5 \times 10^{-1}$ |
| 47 | 3-ethylthiophene | 0.005 | diethyl ether | " | " | 0.02 | " | Hot plate (50° C.) | △ | 3.1 |
| 48 | 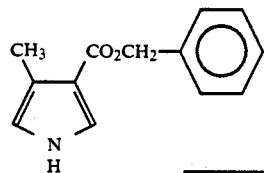 | " | " | " | " | " | " | " | △ | $9.2 \times 10^{-3}$ |
| 49 | aniline | " | methanol | 30 | " | 0.016 | " | 60~80° C. | △ | 2.4 |
| 50 | m-toluidine | 0.01 | THF | 55 | " | 0.022 | " | " | △ | $1.0 \times 10^{-2}$ |
| 51 | 2-aminoanthracene | 0.001 | " | 10 | " | 0.003 | " | Room temp | △ | $3.8 \times 10^{-3}$ |
| 52 | p-aminodiphenylamine | " | " | " | " | " | " | " | △ | $1.4 \times 10^{-3}$ |
| 53 | aniline | 1.05 | " | 100 | " | 0.05 | " | 70° C. | △ | $7.4 \times 10^{-5}$ |

(4) Copolymer Film

Examples 54 to 63

0.833 m mol of

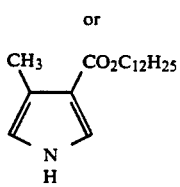 (I)

or

CH$_3$ — CO$_2$C$_{12}$H$_{25}$ (II)

(pyrrole with N-H)

and 0.167 m mol each of pyrrole derivative, thiophene derivative or aniline shown in Table 3 were dissolved in 2 ml of diethyl ether. Into the resulting solution a solution of 0.488 g of FeCl$_3$ (monomer/FeCl$_3$=⅓ molar ratio) dissolved in 10 ml of diethyl ether was added.

The obtained solutions had no deposit of precipitates in 100 minutes or more and were homogeneous. The solution was poured onto a glass plate and dried on a hot plate in air from room temperature to 100° C. The films obtained were homogeneous and had selfretentivity. The obtained film was washed with water and with acetone, dried, doped with iodine by keeping it under iodine vapour, and measured for the conductivity. However, methanol was used instead of diethyl ether as a solvent when aniline was employed.

The results are shown in Table 3.

TABLE 3

(Values shown are conductivity in S/cm.)

| | 3-methylthiophene | 3-phenylthiophene | 2,2'-bithiophene | 3-acetylpyrrole | aniline |
|---|---|---|---|---|---|
| (I) | $4.8 \times 10^{-1}$ | 4.4 | 2.0 | $7.4 \times 10^{-1}$ | 1.4 |
| (II) | $6.2 \times 10^{-1}$ | $0.5 \times 10^{-1}$ | $1.1 \times 10^{-1}$ | $6.3 \times 10^{-1}$ | $3.8 \times 10^{-1}$ |

(5) Polymer Film with Binder Added

Example 64

Example 49 was repeated except that THF was used as a solvent instead of methanol, and 5 g of a solution of which 0.1 g of polyvinyl chloride (PVC polymerization degree: about 1000) was dissolved in 10 g of THF was added.

This polyvinyl chloride mixture solution was applied on a glass plate. The plate was treated in the same manner as that used in Example 49. The complex film had the conductivity of $4.3 \times 10^{-2}$ S/cm.

Examples 65 to 69

Example 64 was repeated except using the respective example conditions shown in Table 4. The results are shown in Table 4.

TABLE 4

| | | | | | | | | | Application | |
|---|---|---|---|---|---|---|---|---|---|---|
| | Monomer | | Solvent | | | Binder | | | method of | Film |
| Example | Compound | Q'ty (mol) | Compound | Q'ty (ml) | FeCl$_3$ (mol) | Compound | Q'ty (g) | Solvent Stability | solvent to substrate | conductivity (S/cm) |
| 64 | aniline | 0.005 | THF | 30 | 0.016 | PVC | 0.1 | ≧100 min | casting | 4.3 × 10$^{-2}$ |
| 65 | aniline | 0.025 | " | 100 | 0.05 | PMMA | 0.2 | " | spin coating | 3.5 × 10$^{-5}$ |
| 66 | aniline | 0.005 | " | 100 | 0.01 | silane coupling agent | 0.04 | " | " | 2.7 × 10$^{-2}$ |
| 67 | 4-methylpyrrole-3-carboxylic acid methyl ester | 0.005 | methanol | 70 | 0.01 | PEG | 0.3 | " | ultrasonic foggeneration | 5.0 × 10$^{-1}$ |
| 68 | 3-methylthiophene | 0.01 | THF | 100 | 0.025 | PMMA | 0.05 | " | ultrasonic foggeneration | 1.7 × 10$^{-2}$ |
| 69 | aniline | 0.01 | acetic acid ethyl ester | 80 | 0.03 | polystylen | 0.1 | " | ultrasonic foggeneration | 2.3 |

(6) Polymer Film with Functional Material Added

Example 70

0.486 g (0.003 mol) of anhydrous ferric chloride (FeCl$_3$) was dissolved in 10 ml of dried diethyl ether, and the insoluble matter was filtrated to make a homogeneous oxidizing solution. A solution of which 0.201 g of 4-methylpyrrole-3-carboxylic acid phenyl ester (MPYCP) was dissolved in 2 ml of methanol was added to the obtained oxidizing solution. In addition, 10 mg of BDP was added to the mix and dispersed. This solution was cast on a platinum plate to form a functional electrode with BDP trapped.

Figure 3:
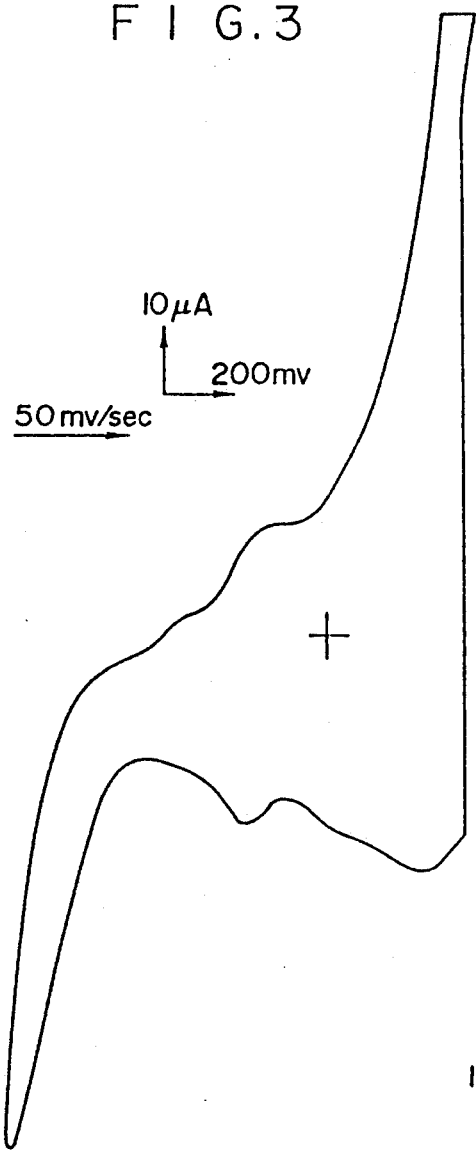
FIG. 3 shows the C.V. of 4-methylpyrrole-3-carboxylic acid phenyl ester (hereinafter abbreviated as MPYCP) polymer film/Pt, which traps BDP (Note 3), in 0.1 mol/l TBAP/CH$_3$CN electrolyte, which is obtained in Example 70.
Figure 4:
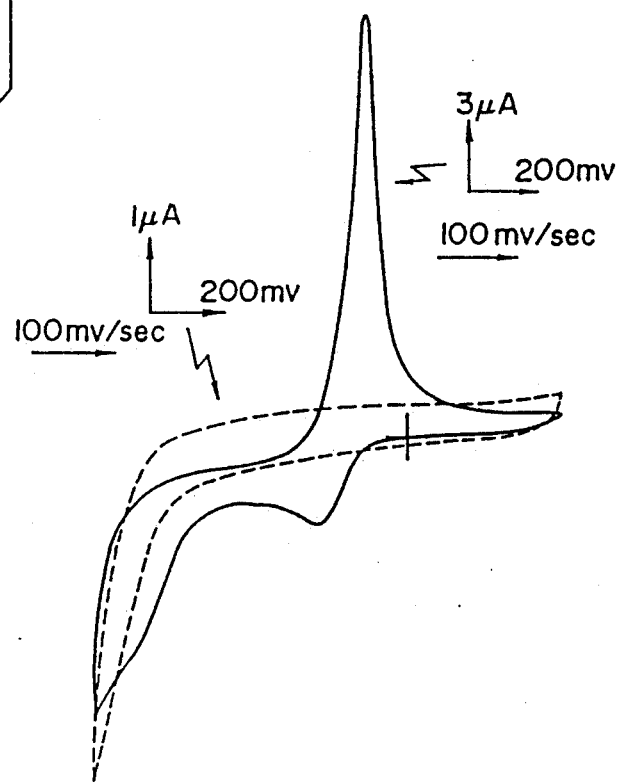
FIG. 4 shows the C.V. of BDP alone, used in Example 70.
  Solid line: when Pt was used as the working electrode in the 0.1 mol/l TBAP/BDP.CH$_3$CN electrolyte.
  Dotted line: when Pt was used as the working electrode in the 0.1 mol/l TBAP/CH$_3$CN electrolyte.

The C.V. of this electrode is shown in FIG. 3. The C.V. of BDP alone is shown in FIG. 4.

As shown in the figures, the BDP functional electrode exhibited the electric response of BDP in the polymer matrix.

Example 71

Example 1 was repeated to prepare a homogeneous cast solution except that 0.139 g of 4-methylpyrrole-3-carboxylic acid methyl ester (MPYCM) was used instead of the pyrrole derivative used. Into the cast solution, 10 mg of VO-tetrapyrazinopolphyradine ester (note) was mixed and dispersed. This cast solution was cast on a platinum plate for form a complex functional electrode.

Figure 5:
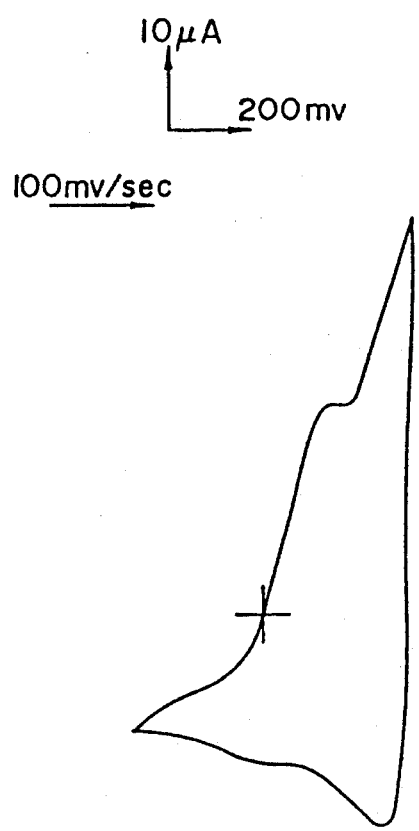
FIG. 5 shows the C.V. of 4-methylpyrrole-3-carboxylic acid methyl ester (hereinafter abbreviated as MPYCM) polymer film/Pt, which traps VO-tetrapyrazinoporphyradine ester, in the 0.1 mol/l TBAP/CH$_3$CN electrolyte, which is obtained in Example 71.
Figure 6:
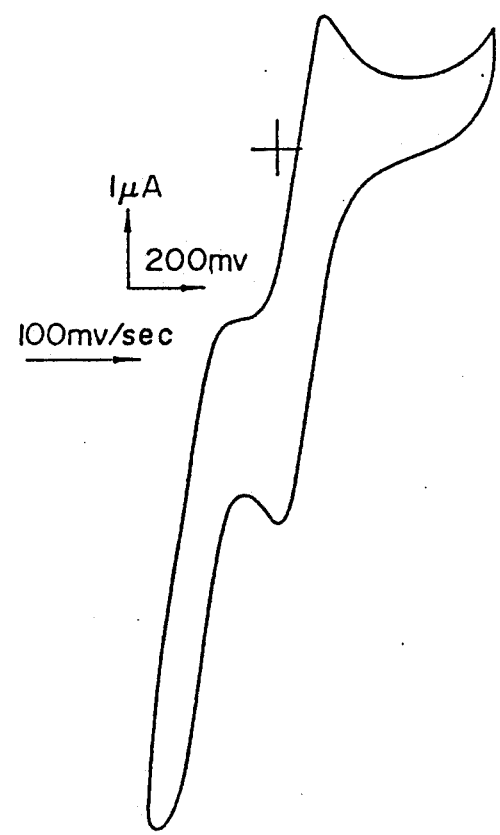
FIG. 6 shows the C.V. of VO-tetrapyrazinoporphyradine ester/Pt in the 0.1 mol/l TBPA/CH$_3$CN electrolyte.
Figure 7:
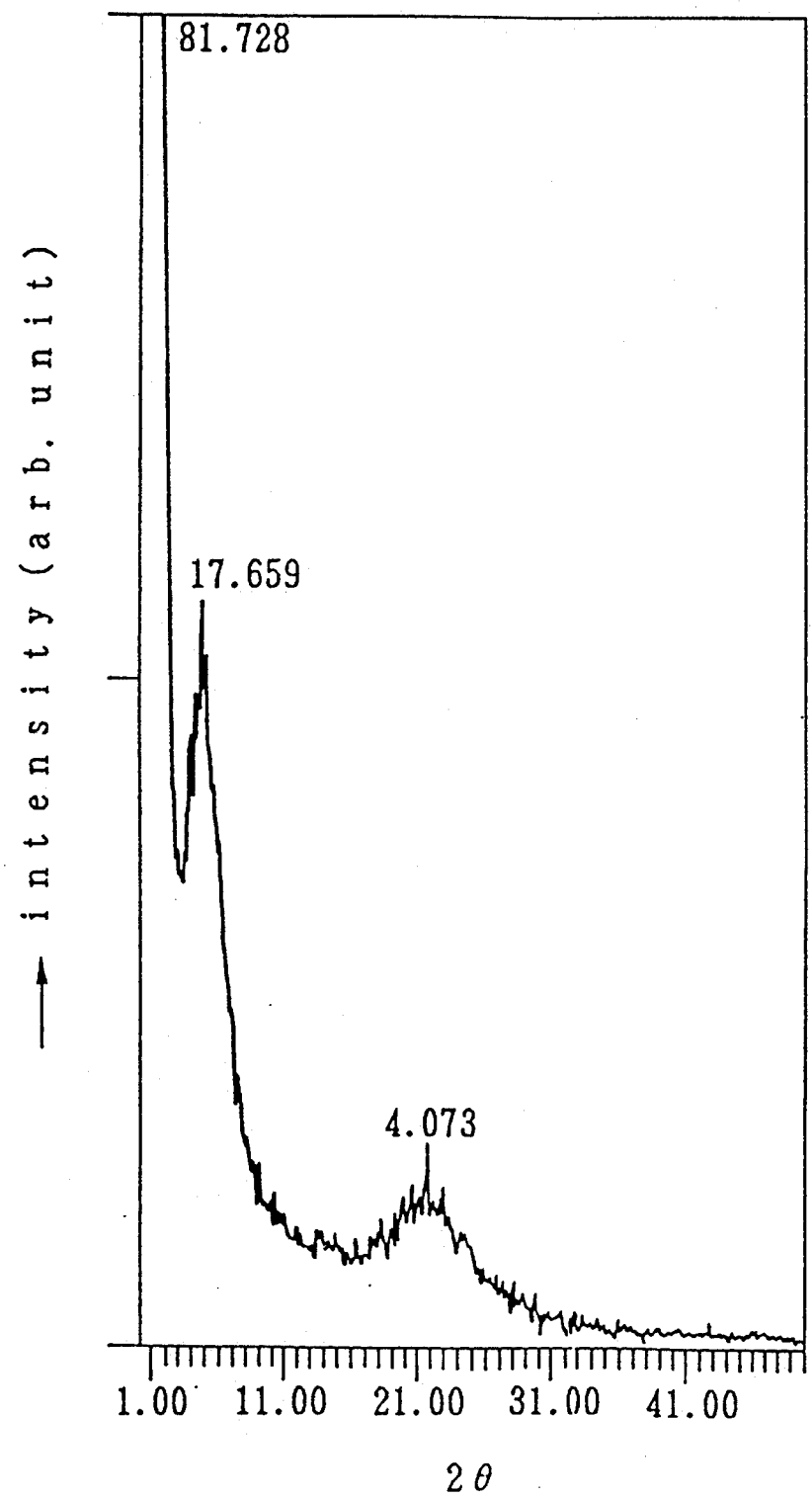
FIG. 7 shows the X-ray diffraction pattern of 4-methylpyrrole-3-carboxylic acid hexyl ester polymer film obtained in Example 72.

The C.V. of this electrode is shown in FIG. 5. The C.V. of VO-tetrapyrazinopolphyradine ester along is shown in FIG. 6.

An electric response of VO-tetrapyrazinopolphyradine was observed in the polymer matrix, as seen from the figures.

(Note) VO-tetrapyrazinoporphyradine ester: 29H, 31H, tetrapyradino (2,3-b:2',3'-g:2'',3''-l:2''',3'''-g) porphyradine-2,3,9,10,16,17,23,24-octacarboxylic acid octyl ester-VO complex

(7) Measurement of Polymer Film Mechanical Strength

The film tensile strength at break was measured for the washed and iodine-doped films which were obtained in the said Example 7 (4-benzylpyrrole-3-carboxylic acid methyl ester), Example 9 (4-methylpyrrole-3-carboxylic acid hexyl ester), Example 26 (4-methylpyrrole-3-carboxylic acid benzyl ester) and Example 29 (4-hexylpyrrole-3-carboxylic acid methyl ester), by using a tensile tester TENSILON UTM-1 Type 5000 (ORIENTEC CORP).

Each of the said films was cut to a size (thickness × width × length) of 20 to 100 μm × 10 mm × 30 mm, and set in the tensile tester with 15 mm of distance between chucks. A tensile test was carried out at a cross head speed of 300 mm/min at temperature of 20° C. In all cases, 3 or more measurement results were averaged to give as the measured value.

| Example | Film after washed | Iodine-doped film |
|---|---|---|
| 7 | 74 kg/cm | 65 kg/cm |
| 9 | 112 | 55 |
| 26 | 11 | 13 |
| 29 | 62 | 43 |

(8) Measurement of Polymer Film Orientation

Example 72

Anhydrous ferric chloride FeCl$_3$ 0.5 g (3.0×10$^{-3}$ mol) was added to dissolve in 10 ml of dried 1,2-ethylene dichloride/methanol (=8/2 vs.vol). To this solution was added 0.209 g (1.0×10$^{-3}$ mol) of 4-methylpyrrole-3-carboxylic acid hexyl ester. This obtained stable and homogeneous mixed solution was poured on to glass plate. After evaporation of the solvents, the raw film was obtained. The raw film was washed with methanol and dried in a desiccator under reduced pressure for an overnight. The X-ray diffraction patterns of this film were measured. After the film was exposured to I$_2$ atmosphere, the conductivity of the film was measured to be 4.0 S/cm.

Figure 8:
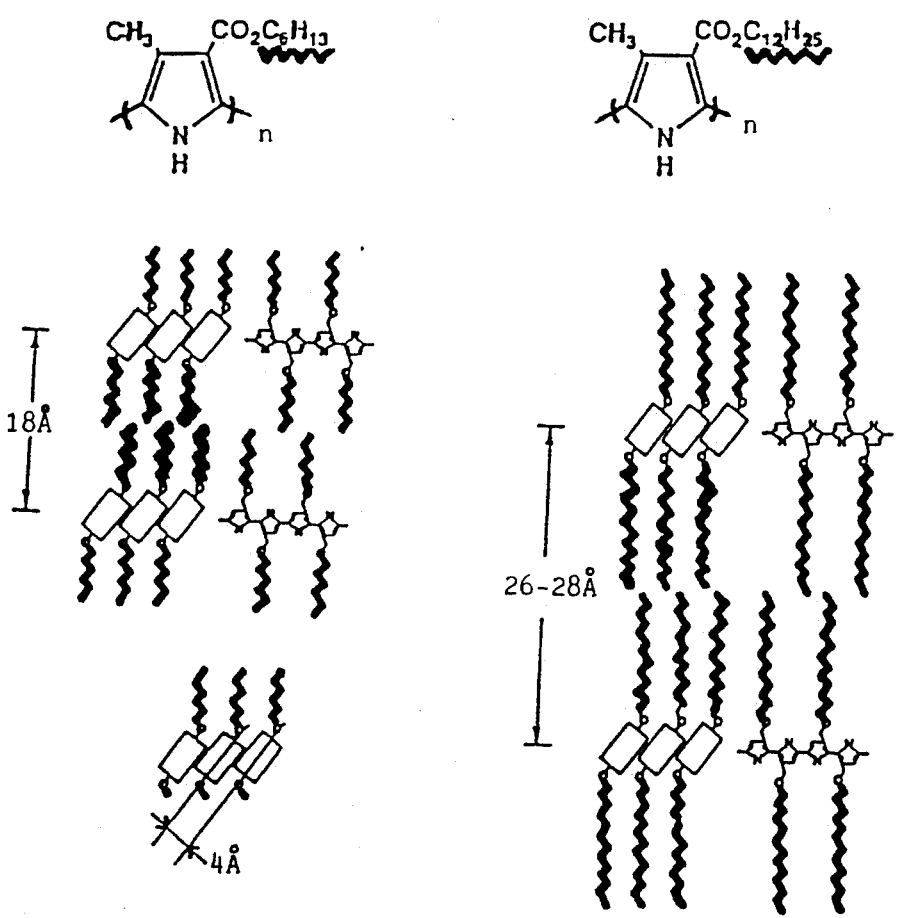
FIG. 8 shows the supposed model of polymer film.

FIG. 8 shows the X-ray diffraction patterns measured.

A peak of small angle below 2θ=5° (H) and a broad distribution of scattered intensity around 2θ=22° (P) were observed.

M. Yamaura et al. have discussed a model of unstretched and stretched polypyrrole film based on the structure analysis by X-ray diffractions.

In consideration of this assignment, we assumed the scattering (H) correspond to twice as much as the strength of hexyl chains of the substituent and scattering (P) to the face-to-face distance of pyrrole rings.

These results indicate the structure of the film is a kind of double-layered structure shown in FIG. 8.

The occurrence of the small angle peak below 2θ=5° and a broad distribution of the scattered intensity around 2θ=22° were typical for the whole series of 3,4-disubstituted polypyrroles containing alkyl chains ($\geq C_4$).

Example 73

Ahydrous ferric chloride $FeCl_3$ 400 mg was dissolved in 10 ml of diethyl ether. To 2 ml of this solution was added 60 mg of 4-methylpyrrole-3-carboxylic acid dodecyl ester.

The obtained stable and homogeneous mixed solution was poured on to a glass plate. After evaporation of the solvents, the raw film was obtained. The raw film was washed with methanol and acetone, and dried. The conductivity of the film was measured to be 3.1 S/cm.

Figure 9:
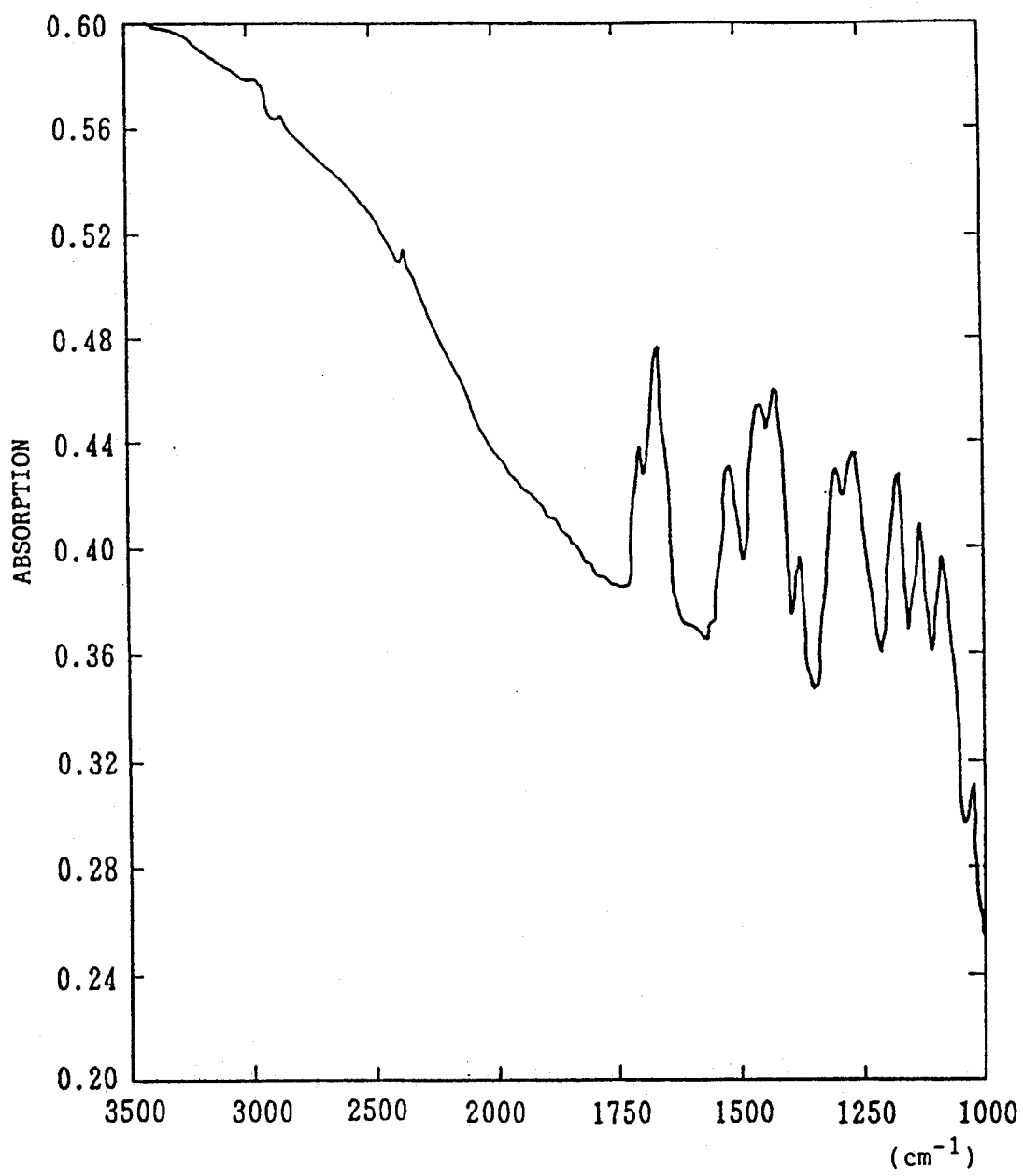
FIG. 9 shows the FT-IR spectrum in polarized infrared RAS (Note 4) spectrum technique of 4-methylpyrrole-3-carboxylic acid dodecyl ester polymer film obtained in Example 73.
Figure 10:
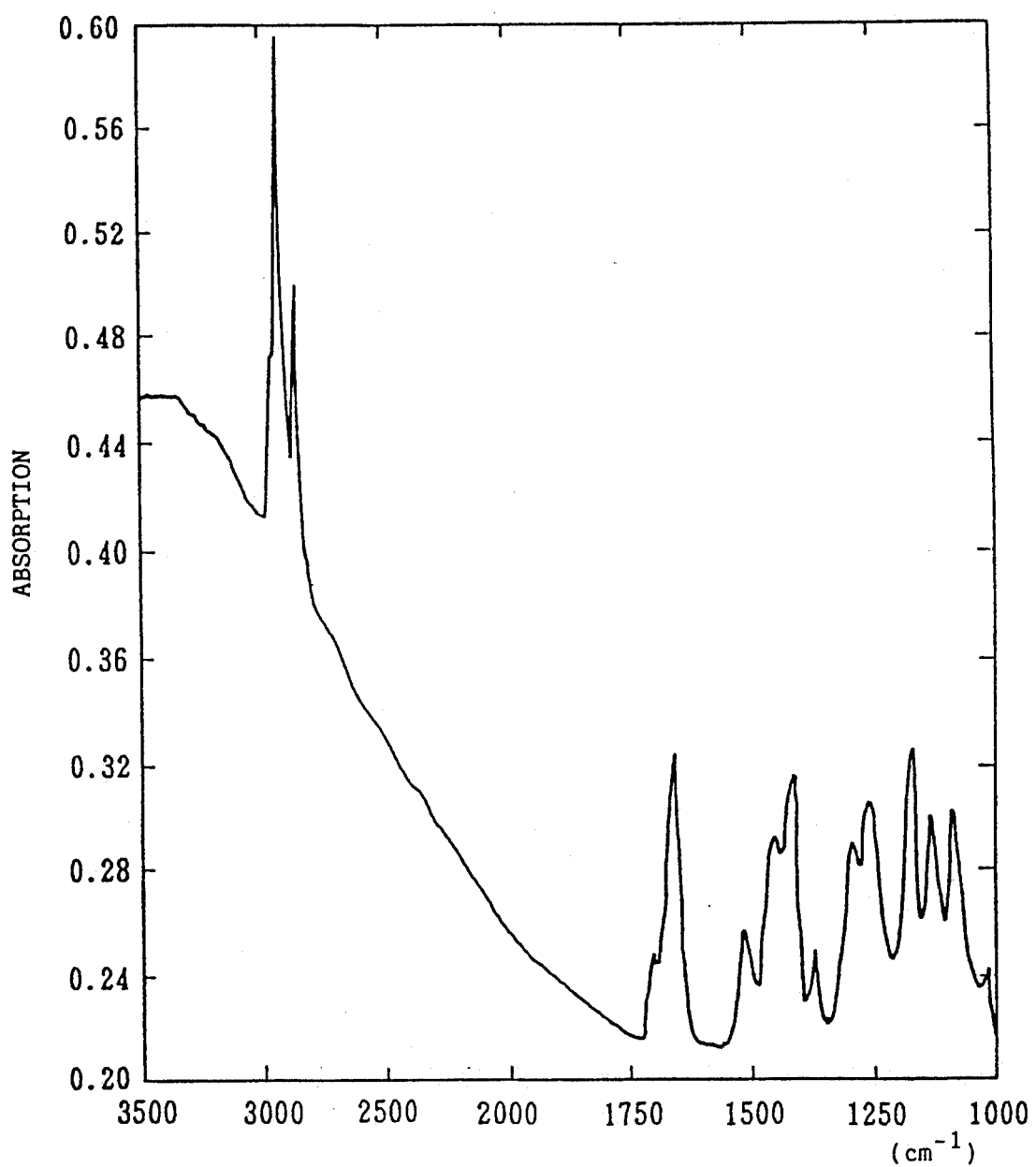
FIG. 10 shows the FT-IR spectrum in polarized infrared transmission technique of 4-methylpyrrole-3-carboxylic acid dodecyl ester polymer film obtained in Example 73.

FIG. 9 shows the FT-IR spectrum in polarized infrared RAS (Note 4) spectrum technique and FIG. 10 shows the FT-IR spectrum in polarized infrared transmission technique of the polymer film obtained.

It is well known that the electronic vectors of incident infrared ray are able to be turned perpendicular to the plane of the film in polarized infrared RAS techniques or, on the other hand, parallel to the plane of the film in TS-M techniques.

In FIG. 10 (TS-M), we observed two strong absorptions around 2920 $cm^{-1}$ and 2850 $cm^{-1}$ which were assigned to the symmetric and asymmetric C—H streching vibrations. In FIG. 9 (RAS-M), these absorptions were almost disappeared.

This result of the spectra indicates that the alkyl chains are perpendicularly stacked on the plane of the film.

In these results of X-ray diffraction and FT-IR spectra, we assumed that the films were constituted by stacked units shown in FIG. 8.

INDUSTRIAL APPLICABILITY

As shown in the examples of this invention, in the method for the preparation of conductive polymer film, a selection of a combination of an aromatic compounds of polymerizable monomers, oxidizing agents and solvents made it possible to give a polymer precursor solution having no precipitate in at least about 100 minutes while remaining stable in a homogeneous state. As a result, a homogeneous polymer film was obtained when the solution was applied on a substrate. A polymer film having self-retentivity, that is, able to be handled after it was peeled off from the substrate, was obtained by the use of a specific compound selected from aromatic compounds. A polymer film with particularly large tensile strength was obtained particularly when a 3,4-asymmetrically substituted pyrrole derivative having a —COOR group at the 3 or 4 position was used as an aromatic compound.

The conductive polymer films produced by this invention, thanks to the possession of the said outstanding effects, are useful as corrosion preventive materials for metal surfaces, coating materials to prevent oxidation deterioration of semiconductors, transparent electrodes formed by coating the film on a transparent material such as glass plate or polymer film, or electrochromic materials, switching components, galvanic cells, capacitors, or dielectrics.

Compounding of conductive polymer and functional molecule by this invention, when compared with the electrochemical method, needs no complex conditions nor does it require the modification of an expensive material with an anionic group. A functionalized conductive polymer can be easily obtained on a various types of substrates or as a film having self-retentivity.

It is possible to introduce a functional molecule into a matrix, regardless of the oxidation potential of the conductive polymer matrix. The possibility of introduction of useful functional molecule without exposure, to unnecessary high voltage causes less deactivation and decomposition of the functional molecule. The method of this invention is thus useful as a means to easily obtain a functionalized conductive film or to simply make a functionalized polymer matrix a film.

These are expected to have a very wide variety of applications such as electronic devices, pyro, piezoelectric elements, light-energy conversion, light modulator or optical modulator, photo shutter, photo memory, separation membrane, polymer catalyst, or biopolymer catalyst.

We claim:

1. A process for the preparation of a conductive aromatic polymer film which comprises reacting an aromatic monomer selected from the group consisting of substituted and unsubstituted pyrrole, substituted and unsubstituted thiophene, and substituted and unsubstituted aniline, with a metal containing oxidizing agent dissolved in an amount of solvent effective to prevent immediate polymerization, and eliminating the solvent whereby a conductive polymer film is formed.

2. A process according to claim 1 wherein the reaction is conducted in the liquid phase.

3. A process according to claim 1 wherein the aromatic monomer is a 3,4-asymetrically substituted pyrrole having a —COOR group, wherein R is an alkyl, benzyl or phenyl group, in the 3-position.

4. A process according to claim 1 wherein the aromatic monomer is a 3,4-asymetrically substituted pyrrole having a —COOR group, wherein R is an alkyl, benzyl or phenyl group, in the 4-position.

5. A process according to claim 3 wherein the aromatic monomer is pyrrole-3-carboxylic acid alkyl ester.

6. A process according to claim 1 wherein the aromatic monomer is pyrrole-3-carboxylic acid alkyl ester.

7. A process according to claim 1 wherein the aromatic monomer is 4-methyl-pyrrole-3-carboxylic acid alkyl ester.

8. A process according to claim 1 wherein the aromatic monomer is 4-methyl-pyrrole-3-carboxylic acid alkyl ester.

9. A process according to claim 3 wherein the aromatic monomer is 4-benzyl-pyrrole-3-carboxylic acid alkyl ester.

10. A process according to claim 1 wherein the aromatic monomer is 4-benzyl-pyrrole-3-carboxylic acid alkyl ester.

11. A process according to claim 1 wherein the aromatic monomer is 3-methyl-thiophene, 3,4-dimethyl thiophene, 3-hexyl-thiophene, 3-stearylthiophene, halogen substituted thiophene, polyether substituted thiophene or mixtures thereof.

12. A process according to claim 1 wherein the aromatic monomer is aniline, N-monosubstituted aniline, substituted aniline, or mixtures thereof.

13. A process according to claim 1 wherein the aromatic monomer is non-substituted aniline.

14. A process according to claim 1 wherein the oxidizing agent is $FeCl_3$, $CuCe_3$, $Fe(NO_3)$, $SbCl_5$, $MoCl_5$ or their hydrates or their mixtures thereof.

15. A process according to claim 14 wherein the oxidizing agent is $FeCl_3$, $FeCl_3 0.6H_2O$ or $Fe(NO_3)_3 0.9H_2O$.

16. A process according to claim 1 wherein the solvent is removed by deaeration under reduced pressure, heat-drying, forced air circulation or air-drying.

* * * * *